(12) United States Patent
Tomikawa et al.

(10) Patent No.: US 7,053,534 B2
(45) Date of Patent: May 30, 2006

(54) PIEZOELECTRIC VIBRATION GYRO-SENSOR

(75) Inventors: Yoshiro Tomikawa, Yonezawa (JP); Yoshiaki Tanaka, Kawasaki (JP)

(73) Assignee: Epson Toyocom Corporation, Kawasaki (JP)

( * ) Notice: Subject to any disclaimer, the term of this patent is extended or adjusted under 35 U.S.C. 154(b) by 173 days.

(21) Appl. No.: 10/654,802

(22) Filed: Sep. 3, 2003

(65) Prior Publication Data

US 2004/0046485 A1 Mar. 11, 2004

(30) Foreign Application Priority Data

Sep. 6, 2002 (JP) .............. 2002-260777

(51) Int. Cl.
*H03H 9/21* (2006.01)
*H03H 9/25* (2006.01)

(52) U.S. Cl. .............. 310/370; 310/313 R; 310/319; 310/366

(58) Field of Classification Search ............ 310/313 R, 310/319, 266, 370
See application file for complete search history.

(56) References Cited

U.S. PATENT DOCUMENTS 5,942,839 A * 8/1999 Ohnishi et al. ............ 310/359
6,288,474 B1 * 9/2001 Ono et al. .................. 310/319
6,490,925 B1 * 12/2002 Inoue et al. ............ 73/504.16

FOREIGN PATENT DOCUMENTS

| CA | 2389316 | * | 3/2002 |
| JP | 9-126783 | * | 5/1997 |
| JP | 11-37761 |   | 2/1999 |

OTHER PUBLICATIONS

Patent Abstracts of Japan for JP 11-037761 published on Feb. 12, 1999.

* cited by examiner

*Primary Examiner*—Thomas M. Dougherty
(74) *Attorney, Agent, or Firm*—Darby & Darby

(57) ABSTRACT

The present invention provides a piezoelectric vibration gyro-sensor utilizing Coriolis force that includes a tuning fork type vibrator in which two rectangular-columnar arms and a base to support the lower end of the arms are integrated; drive electrodes formed on two rectangular-columnar arms; and IDT electrodes of a surface acoustic wave element formed on two arms. Two pairs of the drive electrodes are provided on each rectangular-columnar arm, in which each of the pairs of drive electrodes face each other, and each pair of the drive electrodes are arranged in parallel on the rectangular-columnar arm at a given distance. The IDT electrodes of the surface acoustic wave element are provided between the drive electrodes at the lower end of the rectangular-columnar arms.

7 Claims, 4 Drawing Sheets

PIEZOELECTRIC VIBRATION GYRO-SENSOR

TECHNICAL FIELD OF THE INVENTION

The present invention relates to a vibration gyro-sensor utilizing the Coriolis force.

BACKGROUND OF THE INVENTION

A tuning-fork type gyro-sensor utilizing the Coriolis force is widely used as a sensor to detect the rotation of an object. A tuning-fork type gyro-sensor is simple in structure and can be compact, so that it can be used in cameras as a detector for steadying an image and in a car navigation system.

Japanese Patent Laid Open No. 11-37761 discloses four examples of prior art tuning-fork type gyro-sensors. FIG. 4 shows the overall view of a tuning-fork vibration gyro-sensor described in Japanese Patent Laid Open No. 11-37761.

The conventional tuning-fork type gyro-sensor shown in FIG. 4 has an energy confinement type resonator arranged on the arms. This type of tuning-fork type gyro-sensor detects a change in the rotation speed as a change in the output voltage amplitude of the resonator.

In the conventional tuning-fork type gyro-sensor with the structure shown in FIG. 4, a drive electrode 4 (primary electrode) for flexure vibration is formed on a tuning-fork vibrator 3 which includes two arms 1 and a base 2. Electrodes 5 (secondary electrodes) are arranged in an opposing manner on the front and backside surfaces of each of the two arms 1 to make up the energy confinement resonator. A first drive signal is applied to the drive electrode 4 for flexure vibration of the arms 1 while a second drive signal is applied commonly between the secondary electrodes 5a and 5c to output, from each of secondary electrodes 5b and 5c, a signal whose amplitude is modulated according to the flexure vibration.

In this embodiment of the prior art, the output signal of secondary electrodes 5b and 5c is subject to amplitude modification according to the flexure vibration of the arm 1. However, a change in the amplitude is produced between these two output signals of the secondary electrodes 5b and 5c when the Coriolis force acts on the arms 1 during rotation. Therefore, when the differential signal is taken out from the two output signals, the amplitude difference (amplitude beat component) is produced in the differential signal. Synchronous detection of the amplitude beat component with the first drive signal applied to the drive electrode 4 enables generation of a DC voltage proportional to the rotation speed around the Y-axis in FIG. 4.

Another conventional example from Japanese Patent Laid Open No. 11-37761, FIG. 7, detects a change in the rotation speed as a change in the output frequency by using the energy trapped type resonator. The structure is approximately similar to the one shown in FIG. 4, except that two resonators, which include secondary electrodes, function individually as oscillation elements of two independent oscillation circuits, each outputting different oscillation signals from the secondary electrodes.

In the second conventional example, two oscillation signals are subject to frequency modulation through flexure vibration of the arms respectively, with a frequency difference between these two oscillation signals caused by the Coriolis force during rotation. Therefore, by detecting the frequency difference (frequency beat component) between two oscillation signals and through its synchronous detection with the drive signal applied to the primary electrode, a DC voltage proportional to the rotation speed can be generated.

A third conventional example from Japanese Patent Laid Open No. 11-37761, FIG. 8, has a surface acoustic wave element instead of the energy confinement type resonator shown in FIG. 4.

This prior art example uses the amplitude beat component similarly to the first conventional example to detect rotation.

In addition, the type of gyro-sensor that uses the surface acoustic wave element instead of the energy trapped type resonator shown in FIG. 4 is disclosed as a fourth conventional example. This conventional example uses the surface acoustic wave element as a resonant element of the oscillation circuit, and the detection principle is the same as for the above second conventional example, namely, by detecting change in the frequency difference (frequency beat component) of two resonant signals.

As described above, there are various types of vibration gyro-sensors using the Coriolis force that vary in terms of the material and structure of the vibrator, the arrangement of the primary and secondary electrodes, or the rotation detection method.

However, the following problems concern ordinary vibration gyro-sensors using the Coriolis force, such as the above mentioned conventional examples.

Generally, the materials used for a vibrator are piezoelectric ceramic and crystal. Piezoelectric ceramic is easy to prepare and can be used as a vibrator after performing a dielectric polarization process on the prepared ceramic.

By nature, a piezoelectric ceramic develops localized polarization only in locations where a strong electric field is applied externally, so that after forming the primary electrodes and after the application of a strong electric field between the specified primary electrodes, dielectric polarization can develop in the specified location.

Therefore, piezoelectric ceramic is advantageous since the location of the primary electrodes is relatively less restricted.

However, when compared with quartz crystal, piezoelectric ceramic is generally disadvantageous since it has lower detection sensitivity.

On the other hand, a single crystal material like a quartz crystal has a Q value (quality factor) that is generally higher than the Q value of piezoelectric ceramic.

The use of quartz crystal in tuning-fork vibrators offers such advantages as improved detection sensitivity and superior availability of the detection signal in the signal-to-noise ratio.

However, post-treatment such as localized dielectric polarization that is possible with piezoelectric ceramic is physically impossible when using crystal, and it is necessary to prepare the crystal according to the specified crystal axis beforehand and to arrange the primary electrodes according to the specified crystal axis.

Moreover, the method of preparing the crystal is limited because chemical etching in the specific crystal axis direction (Z direction) is almost impossible. Therefore, when using crystal, the position of the primary electrodes is limited when compared to using piezoelectric ceramic material. Furthermore, it is extremely difficult to form the secondary electrodes in a position where the detection sensitivity is optimum in such a manner that these secondary electrodes do not overlap with the primary electrodes.

SUMMARY OF THE INVENTION

The present invention solves the above described problems and provides a vibration gyro-sensor that has an arrangement of primary and secondary electrodes with superior detection sensitivity, is less restricted in the process of preparation, and uses crystal as a material for the tuning-fork vibrator.

To achieve the above objects, the invention according to an embodiment of the present invention comprises a piezoelectric vibration gyro-sensor having a tuning fork type vibrator in which two rectangular- or square-columnar arms and a base for supporting the lower end of the arms are integrated; drive electrodes (primary electrodes) formed on the two square-columnar arms; and IDT electrodes (secondary electrodes) of a surface acoustic wave element formed on the two arms. The IDT electrodes of the surface acoustic wave element are disposed between the drive electrodes at the lower end of the square-columnar arms. The drive electrodes are arranged in parallel at a given distance along the major crystal axis on each of two opposing surfaces of the square-columnar arms, and the IDT electrodes of the surface acoustic wave element are formed together with the drive electrodes on one surface of the square-columnar arms.

The invention according to another embodiment of the present invention uses an X-cut crystal in the above described tuning-fork type vibrator, in which the major axis direction of the above mentioned square-columnar arm is the Y-direction of the crystal axis.

BRIEF DESCRIPTION OF THE DRAWINGS

The foregoing and other features of the present invention will be more readily apparent from the following detailed description and drawings of the illustrative embodiments of the invention wherein like reference numbers refer to similar elements and in which.

DETAILED DESCRIPTION OF THE INVENTION

Figure 1:
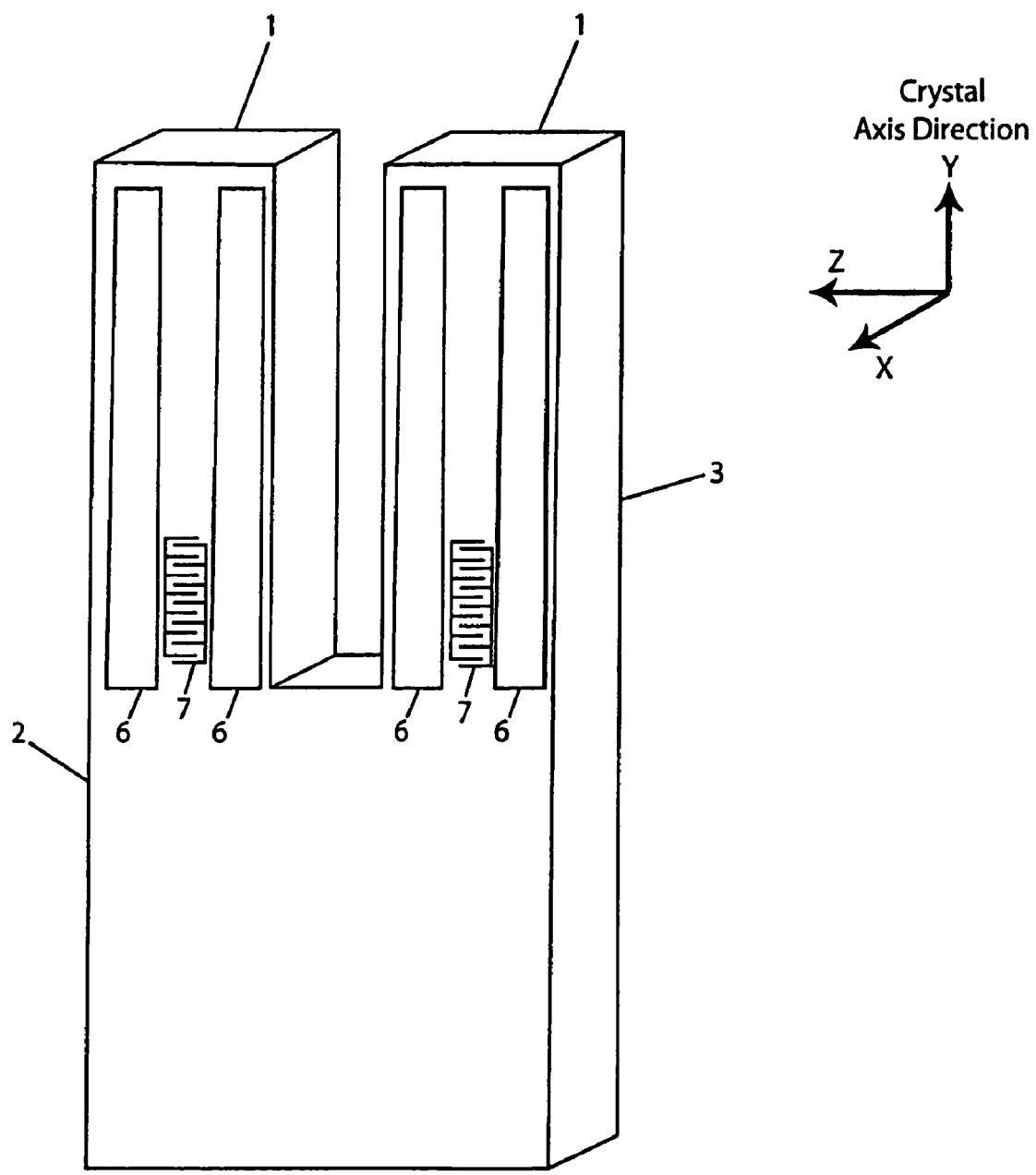
FIG. 1 is a perspective view of piezoelectric vibration gyro-sensor according to the present invention.

The present invention is described in detail while referring to illustrated examples of the embodiments. FIG. 1 shows a perspective view of a piezoelectric vibration gyro-sensor according to the present invention.

Referring to FIG. 1, the vibration gyro-sensor is provided with a tuning fork type vibrator 3 made of crystal in which two arms 1 and a base 2 are integrated. Rectangular drive electrodes 6 (primary electrodes) are arranged in parallel in an opposing manner on the front and backside surfaces of each arm 1. Interdigital transducer (IDT) electrodes 7 (secondary electrodes) of a surface acoustic wave element are arranged between the drive electrodes 6 at the lower end of one surface of the arms 1. In this embodiment, the longitudinal axes of the arms 1 are parallel to the Y-direction of the crystal axis.

A pair of IDT electrodes may only be arranged as the secondary electrodes. A reflector can be arranged on both sides of the IDT electrode, or there can be multiple IDT electrodes.

The reason for arranging the IDT electrode 7 of the surface acoustic wave element at the lower end of the arm 1 is that the detection sensitivity is higher in the lower end position than in the top end position. Namely, the distortion detected by the gyro-sensor is at a maximum near the base of the arm 1 when the arm 1 is subjected to flexural vibration.

Figure 2:
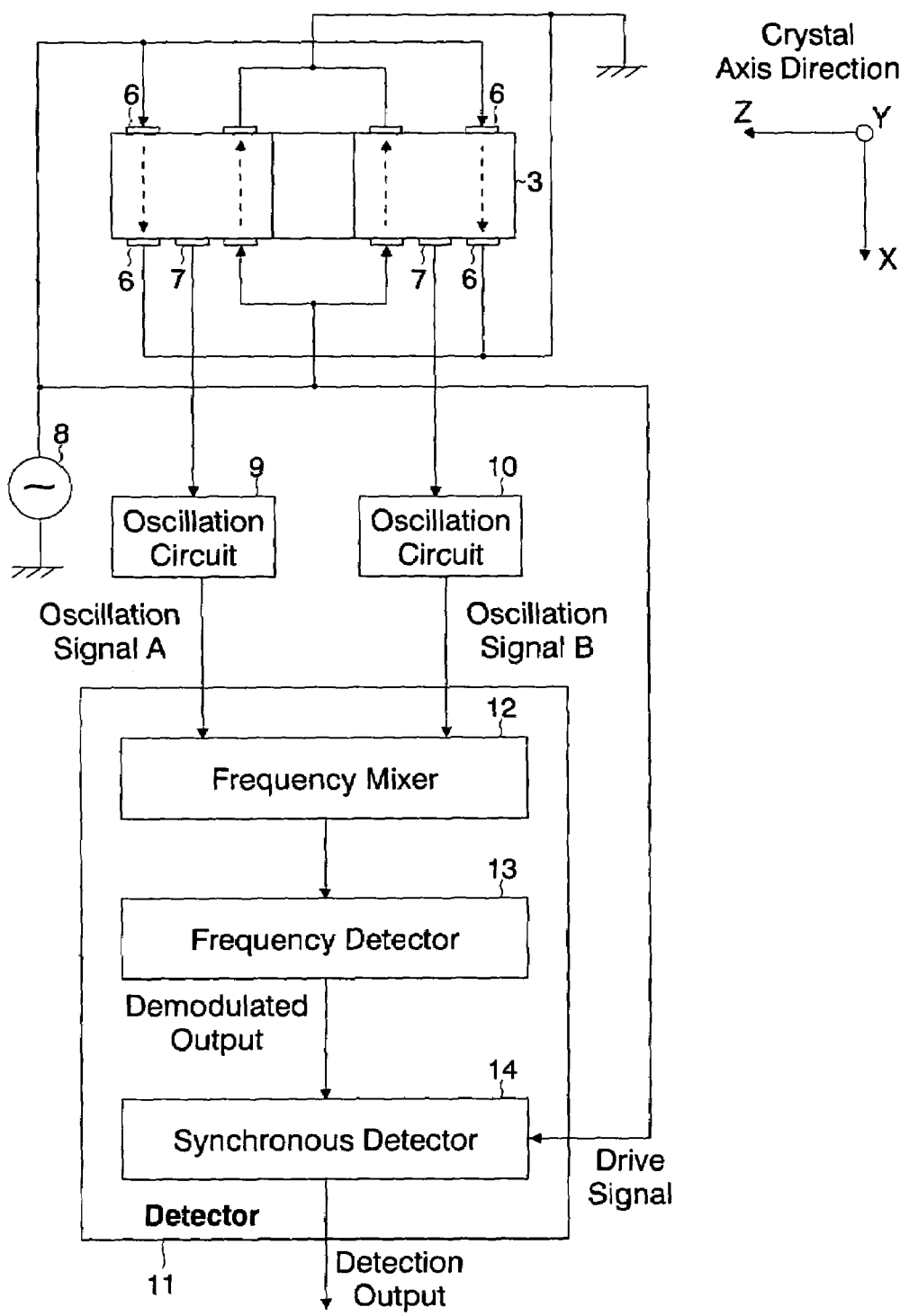
FIG. 2 is a block diagram of the detector of the piezoelectric vibration gyro-sensor according to the present invention.

FIG. 2 shows the vibration gyro-sensor and the circuitry around the sensor. In FIG. 2, eight drive electrodes 6 are arranged, two on each of the opposing front and backside surfaces of the arms 1 of the tuning-fork vibrator 3.

Among these eight drive electrodes 6, each of the four pairs are interconnected by the wiring pattern illustrated in FIG. 2. A drive signal source 8 is connected to one of the drive electrodes 6 of each pair of drive electrodes 6 and applies a drive signal.

Two IDT electrodes 7 of the surface acoustic wave element are formed on one surface of the arms 1 and are respectively connected to oscillation circuits 9 and 10. The two IDT electrodes function as oscillation elements for the oscillation circuits 9 and 10.

In this embodiment, the IDT electrodes 7 of the surface acoustic wave element are formed according to individual oscillation frequencies in such a manner that the oscillation frequencies of the oscillation circuits 9, 10 are different.

Moreover, oscillation circuits 9 and 10 supply oscillation signals A and B, together with the drive signal, to a detector 11 (detection circuit). The detector 11 is comprised of a frequency mixer 12, a frequency detector 13, and a synchronous detector 14, which generates a DC voltage proportional to the rotation speed and outputs the DC voltage as a detection signal.

The vibration gyro-sensor shown in FIG. 2 operates as follows. Firstly, the condition in which there is no rotation around the Y-axis is considered. The arms 1 vibrate flexurally in the Z-axis direction when the drive signal is applied to the drive electrodes 6. In this case, the distance between the IDT electrodes 7 of the surface acoustic wave element changes subtly according to the flexural condition of the two arms 1, causing a change in the oscillation frequency of the oscillation signals A and B.

The oscillation signals A and B are subject to frequency modulation from the high frequency state to the low frequency state according to the flexural condition. Since the two arms 1 are mutually synchronized for flexural vibration in the Z-axis direction and the instantaneous flexural condition is then almost the same, the frequency difference between the oscillation signals A and B is almost constant, and frequency modulation synchronized to the drive signal is applied to the oscillation signals A and B respectively.

Accordingly, when the oscillation signals 1 and 2 are mixed in the frequency mixer 12 to output the frequency difference component of these signals in the detection circuit 11 in this (non-rotating) condition, an approximately constant frequency component can be obtained. If the frequency difference component is demodulated by the frequency detector 13, almost no output signal (the frequency component similar to the drive signal) appears in the demodulated output. Therefore, even if the demodulated output is synchronously detected with the drive signal, almost no output signal (DC component) appears in the detection output.

When rotation around the Y-axis is applied to this embodiment of the vibration gyro-sensor, the Coriolis force proportional to the rotation speed acts in the X-axis direction on each arm 1, and each arm 1 also experiences a flexural vibration in the X-axis direction.

Coriolis forces acting on each arm 1 are mutually opposite in direction, and the distance between the IDT electrodes 7 of the surface acoustic wave element varies greatly. In this case, the arms 1 operate synchronously.

Since movement of one arm 1 in the positive (+) direction along the X-axis causes the other arm to move in the negative (−) direction of the X-axis, the two IDT electrodes 7 of the surface acoustic wave element also move in opposite directions.

Accordingly, frequency modulation is applied to the oscillation signals A and B, and its maximum frequency shift is proportional to the rotation speed.

As the change of one frequency to a higher level causes the change of another frequency to a lower level, there arises a difference between instantaneous frequencies of the oscillation signals A and B. Therefore, mixing of the oscillation signals A and B in the frequency mixer 12 and extraction of the frequency difference component of the two signals produces a frequency-modulated signal. When this frequency-modulated signal is demodulated in the frequency detector 13, the demodulated signal, which is synchronized to the drive signal, is output. Moreover, synchronous detection of the demodulated signal with the drive signal causes output of a detection voltage (DC voltage) proportional to the amplitude of the demodulated signal.

In this case, the amplitude of the demodulated signal is proportional to the rotation speed. As described above, when rotation is not applied, however, almost no frequency modulation component appears in the frequency difference component of the oscillation signals A and B, and the amplitude of the demodulated signal is almost zero. Therefore, the DC voltage proportional to the angular speed can be output as the detection voltage only when there is a rotation along the Y-axis.

On the other hand, when the rotation direction is applied in the opposite direction, the Coriolis force acting on each arm is reverted and the polarity of the demodulated signal is inverted relative to the drive signal, so that the detection voltage (DC voltage) is inverted from positive (or negative) to negative (or positive), accordingly. Consequently, the DC voltage proportional to the rotation speed, including the rotation direction, can be output.

Figure 3:
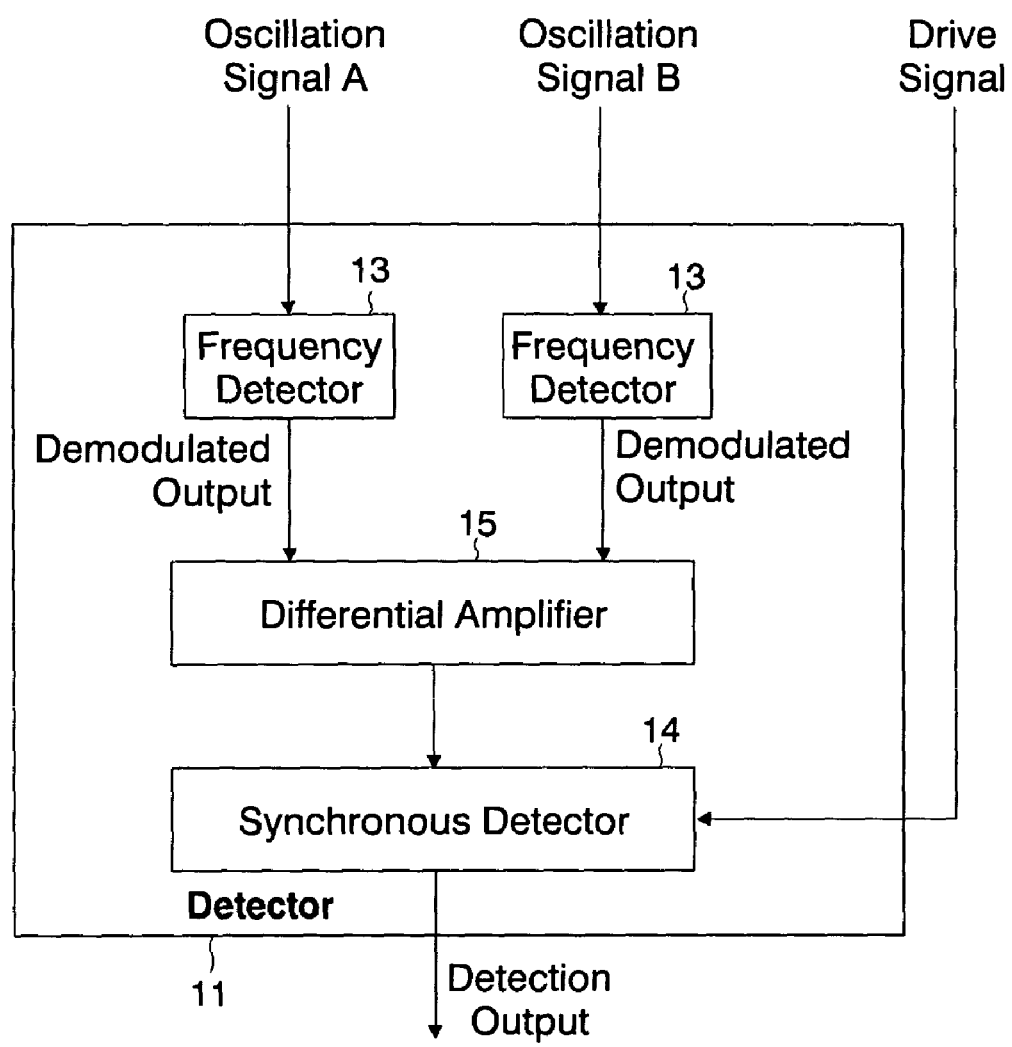
FIG. 3 is an embodiment of the detector of the piezoelectric vibration gyro-sensor according to the present invention.
Figure 4:
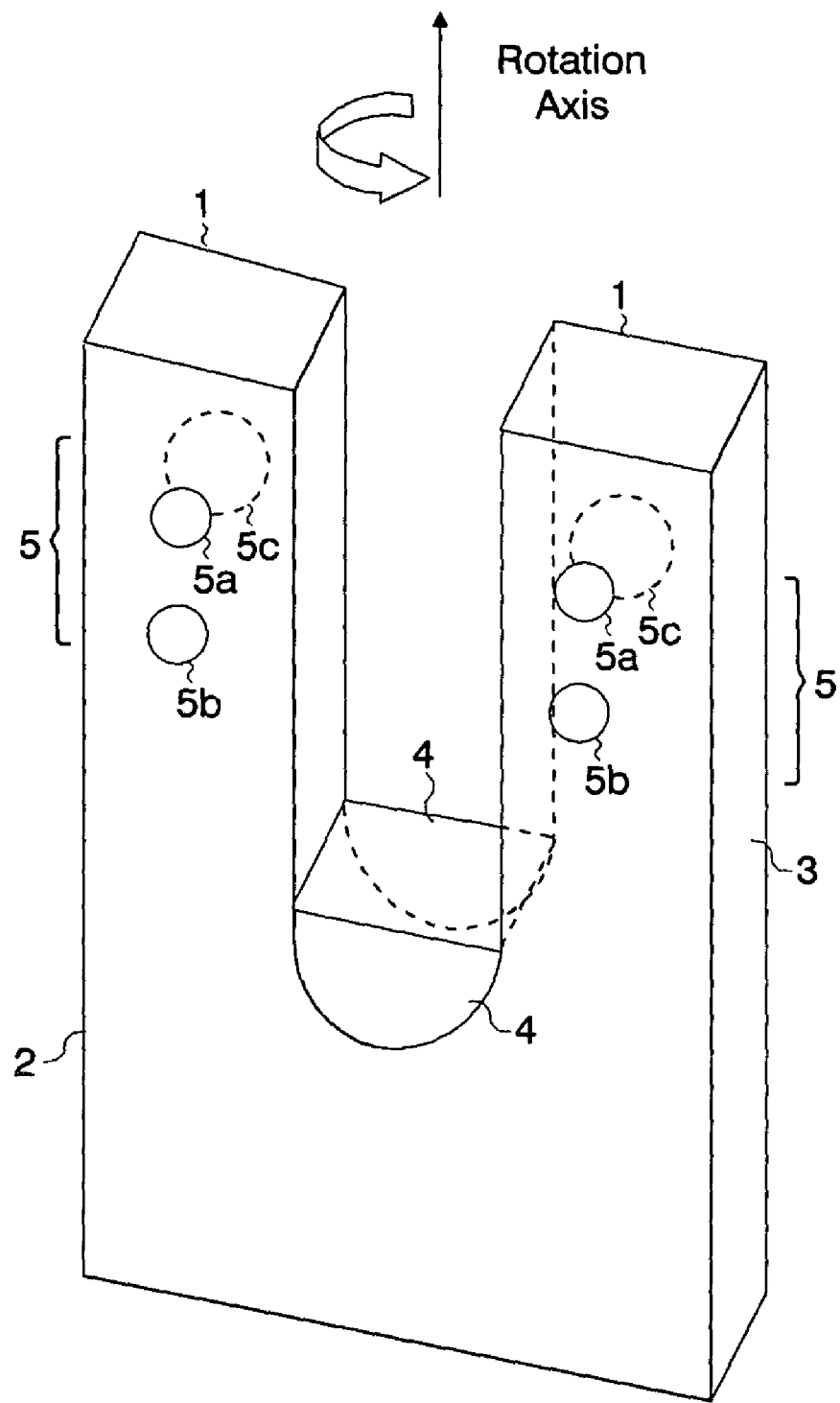
FIG. 4 is a perspective view of the prior art piezoelectric vibration gyro-sensor.

Detector 11 includes the frequency mixer 12, the frequency detector 13, and the synchronous detector 14, and the detector 11 can have two frequency detectors 13 and a differential amplifier 15, as shown in FIG. 3. In this case, the output of the oscillation signals A and B is detected directly by the frequency detector 13, with each demodulated signal differentially amplified by the differential amplifier 15.

Since the differential output appears in the differential amplifier 15 only when a rotation is applied, synchronous detection of the output by the synchronous detector 14 enables generation of the DC voltage proportional to the rotation speed. In this embodiment, the frequency mixer 12 is unnecessary, making extraction of the frequency difference unnecessary, so that the IDT electrodes 7 of the surface acoustic wave element may be formed so that the output frequency is equal between the oscillation signals A and B. In this embodiment, the electrode pattern for the IDT electrodes 7 of the surface wave acoustic element may be the same as in the embodiment of the present invention shown in FIG. 2. Needless to say, different frequencies may be used.

Alternatively, the oscillation signals A and B and drive signal may be digitalized by the detector 11 to output the digital signal corresponding to the detection output (DC voltage) as the detection output.

In any case, any oscillation frequencies of the oscillation signals A and B and any detector 11 may be allowed, provided that the change of the frequency difference between the oscillation signals A and B during rotation, including the rotation direction, can be detected.

In this way, the drive electrodes are arranged in parallel at a given distance and the IDT electrodes of the surface acoustic wave element are provided at the lower end of the arms, so that a vibration gyro-sensor with superior detection sensitivity can be obtained.

The present invention is remarkably effective in providing a vibration gyro-sensor that is easy to prepare and has superior detection sensitivity. The vibration gyro-sensor of the present invention is provided by using the IDT electrodes of the surface acoustic wave element as oscillation elements. In the vibration gyro-sensor of the present invention, the drive electrodes are arranged in parallel on each of the opposing surfaces of the front and backside of the arms, which are made from X-cut crystal, and the IDT electrodes of the surface acoustic wave element are arranged between the parallel-arranged drive electrodes at the lower end of the arms.

Having described embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:
1. A piezoelectric vibration gyro-sensor comprising:
a tuning fork type vibrator comprising:
two rectangular-columnar arms integrated with a base to support lower ends of said arms;
primary electrodes on each of said two arms; and
secondary electrodes of a surface acoustic wave element on each of said two arms, wherein:
two pairs of said primary electrodes are provided on each said arm, said primary electrodes of each said pair of said primary electrodes on each said arm face each other, and each said pair of said primary electrodes are arranged in parallel at a given distance on said arms;
each said secondary electrode of said surface acoustic wave element is provided between said primary electrodes at said lower ends of said arms.

2. The piezoelectric vibration gyro-sensor according to claim 1, wherein:
   said tuning fork type vibrator is made of a X-cut quartz crystal; and
   a longitudinal direction of said arms is parallel with a Y-direction of an axis of said quartz crystal.

3. The piezoelectric vibration gyro-sensor according to claim 1, wherein said primary electrodes are drive electrodes and said secondary electrodes are IDT electrodes.

4. The piezoelectric vibration gyro-sensor according to claim 1, further comprising:
   two oscillation circuits; and
   a detector comprising a frequency mixer, a frequency detector, and a synchronous detector.

5. The piezoelectric vibration gyro-sensor according to claim 1, further comprising:
   two oscillation circuits; and
   a detector comprising a first frequency detector, a second frequency detector, a differential amplifier, and a synchronous detector.

6. The piezoelectric vibration gyro-sensor according to claim 1, wherein said primary electrodes and said secondary electrodes are formed on an X-cut surface.

7. The piezoelectric vibration gyro-sensor according to claim 1, wherein said tuning fork type vibrator is characterized by a single major crystal axis.

* * * * *